United States Patent Office 3,817,886
Patented June 18, 1974

3,817,886
MANUFACTURE OF PARTICULATE POLY-
URETHANE MATERIAL IN AN ORGANIC
MEDIUM AND IN THE PRESENCE OF A
BENTONE
John J. McGarr, Beverly, Mass., assignor to USM
Corporation, Boston, Mass.
No Drawing. Filed June 16, 1972, Ser. No. 263,658
Int. Cl. C08g 22/04
U.S. Cl. 260—18 TN                                12 Claims

ABSTRACT OF THE DISCLOSURE

A method for preparing polyurethane resins in particulate form which comprises reacting together in finely dispersed form in an inert liquid medium, two compounds which are substantially insoluble in that medium, at least one of the reactive compounds being liquid for reactive engagement with the other compound, one of said compounds having isocyanate groups and another of the compounds having groups with reactive hydrogen atoms such as hydroxyl, amino or carboxyl groups and combining with said compound having isocyanate groups to form a reaction product insoluble in the liquid medium and recovering the reaction product.

BACKGROUND OF THE INVENTION

The demand for thermoplastic resin powders is large and steadily growing for such use as coatings and adhesives, particularly in view of the increasing strictness of regulations regarding discharge of solvent materials into the atmosphere. In general, resin powders have been prepared by processes of grinding already formed resinous material or by dissolving already formed resinous material and precipitating the resinous material from solution. However, by the very fact that the resinous materials to be ground are thermoplastic and often relatively tough materials, relatively costly procedures involving chilling of the resin, for example, with liquid nitrogen, have been necessary for effective grinding. In addition to the cost of the refrigerant and of the grinding equipment, sophisticated collecting equipment has been necessary because of the substantial proportion of dust formed in the grinding process.

Solution and precipitation procedures for forming powders have been costly because of the time involved in dissolving the resin and the precipitation which is usually effected by adding to the resin solution an organic liquid miscible with the solvent but incapable of dissolving the resin. This procedure thus involves not only solvent recovery and separation of mixed organic liquids, but also the drying of the precipitated resin with the problems of avoiding escape of organic liquid material. It has been proposed to form resin latices and produce powder by coagulation of the latices; but this process is limited in the character of material to which it is applicable.

BRIEF SUMMARY OF THE INVENTION

It is an object of the present invention to manufacture a resin powder directly, that is, without grinding and without the use of a solvent for the resinous material.

BRIEF STATEMENT OF THE INVENTION

To this end and in accordance with a feature of the present invention materials reactive to form a solid reaction product are separately dispersed in an organic liquid medium which is inert to the reactive materials and in which they and the reactive product are insoluble. At least one of the reactive materials is a liquid and reaction occurs between the dispersed materials to form fine particles of solid reaction product. These fine particles of reaction product are separated from the liquid medium by suitable procedures.

DETAILED DESCRIPTION OF THE INVENTION

Fine powder is formed according to the method of the present invention by reaction in an inert organic liquid medium of a first reactant in finely dispersed form and a second reactant also in finely dispersed form which combines with the first reactant to form a solid reaction product, at least one of the ractants being liquid for reactive engagement with the other reactant. The continuous phase in which the reactants are dispersed is an organic liquid medium which is inert to the reactants and in which both reactants and also the reaction product are immiscible or insoluble. The reaction mixture may be formed by introducing the two reactants separately and finely dispersing them in the inert liquid medium or by finely dispersing a first reactant in a body of inert liquid medium and thereafter finely dispersing the second reactant in the same body of liquid medium for reaction with the first reactant. Alternatively, the two reactants may be dispersed in separate bodies of inert liquid and the bodies of liquid combined to form a mixture in which the reactants may react. The reaction products from chemical combination and polymerization of reactants remain in dispersed form as solid particles insoluble in the liquid medium and may be separated as fine powder.

The method of the present invention has been found particularly useful in the manufacture of polyurethane powder by reacting at least one organic compound of which at least two groups per molecule contain active hydrogen atoms which are reactive with —NCO groups, and at least one organic compound having at least two —NCO groups per molecule.

Organic liquids for use as the continuous phase of the emulsion may be any liquid not reactive with the reactants, e.g., not reactive with —NCO or with active hydrogens where the product is to be a polyurethane, and in which the reactants and reaction product are immisible and insoluble. It is ordinarily desired that such liquids be volatile for removal from the reaction product by evaporation at temperatures which will not harm the product; and that the boiling point be above the desired reaction temperature. Liquids with lower boiling points may be used but may require the use of pressure vessels to allow operation at the desired temperature. Liquids which are high boiling or otherwise difficult to separate from the reaction product may be removed by washing or removing by solvent extraction with liquids which do not harm the reaction product and which are more readily removed. Organic liquids having a boiling point or boiling range, preferably between about 65° C. and about 200° C. such as hydrocarbons, halogenated hydrocarbons, ethers . . . may be used. Hydrocarbon liquids, preferably aliphatic hydrocarbon liquids, such as petroleum fractions, have been found desirable because of their low cost, inertness to the reactants and ease and completeness of removal from the reaction product.

Any organic compound or mixture of compounds having at least two —NCO groups, preferably a compound or mixture of compounds, which is liquid at reaction temperature and which is insoluble in the organic liquid of the continuous phase may be dispersed in that liquid for use in the method. The —NCO terminated products, i.e. prepolymers, from reacting a stoichiometric excess of one or more monomeric polyisocyanates with one or more organic compounds having at least two groups containing active hydrogen atoms have been found particularly useful. Polyisocyanates useful to form such products include:

cyclohexylene-1,4-diisocyanate,
2,4-tolylene diisocyanate,
2,6-tolylene diisocyanate,
4,4'-diphenylmethane diisocyanate,
3,3'-dimethyldiphenylmethane-4,4'-diisocyanate, and
4,4'-dicyclohexylmethane diisocyanate,
p-phenylene diisocyanate,
m-phenylene diisocyanate,
xylylene diisocyanate,
1,4-naphthylene diisocyanate,
diphenyl-4,4'-diisocyanate and
hexamethylene diisocyanate.

Organic compounds having at least two groups containing active hydrogen atoms useful to form these —NCO terminated reaction products include 1,4-butanediol, 1,5-pentanediol, 1,6-hexanediol, diethylene glycol, p-phenylene-di-beta-hydroxy-ethyl ether, trimethylol propane, glycerol, and alkanolamines such as diethanolamine, diamines, such as ethylene diamine, hexamethylene diamine and 4,4'-diaminodiphenyl methane, hydroxyl terminated polyesters from reaction and polymerization of organic compounds having at least two hydroxyl groups such as glycol, polypropylene glycol, hexanediol, bis-(hydroxy methyl cyclohexane), 1,4-butanediol, diethylene glycol, polyethylene glycol and mixtures of these and organic compounds having at least two carboxyl groups such as adipic acid, succinic acid, sebacic acid, azelaic acid and mixtures of these, polyesteramides, polyhydric polyalkylene ethers, polyhydric polythioethers, polypropylene glycol, polybutylene glycol, polyalkylene ether glycols from condensation of an alkylene oxide such as ethylene oxide, propylene oxide and butylene oxide with a compound containing active hydrogens such as water, ethylene glycol and propylene glycol, polytetramethylene ether glycols and mixtures of these.

It is preferred that the reactive organic compound having at least two —NCO groups be a liquid at room temperature for ease in emulsification. Compounds which are normally solid or viscous liquids may be heated to temperatures at which they are liquid with a viscosity preferably below 300,000 cps. at emulsification temperature enabling reactive contact with materials reactive with them and also enabling ready emulsification. It is also preferred that the molecular weight of the compounds be from about 500 to about 4,000.

Any organic compound or mixture of compounds having at least two groups per molecule containing active hydrogens, which is insoluble in the organic liquid of the continuous phase may be dispersed in that liquid as the second reactant in the method. Suitable compounds include polyols, polyamines and alkanolamines of the general class of those reacted to form prepolymers referred to above; but it is preferred that these compounds, which may be regarded as chain extenders have carbon chains of from two to ten carbon atoms. The molecular weight of the compounds to be dispersed as the second reactive droplets should preferably be from about 62 to about 300.

The first reactant, i.e. the compound or compounds having reactive —NCO groups and the second reactant, i.e. the compound or compounds having groups containing active hydrogens are employed in relative proportions giving a molar ratio of active hydrogen to —NCO in the range of from about 0.85:1 to about 1.15:1. Where a thermoplastic resin is desired, the ratio should be from about 1:1 to about 1.15:1.

Surfactants are used to facilitate dispersions of the reactive material in the continuous phase of inert liquid. Surfactants which have been found useful include alkaline earth metal salts of long chain aliphatic monocarboxylic acids such as calcium stearate, and the products resulting from cation exchange reaction between long carbon chain amines and montmorillonite (commercially available under the trademark, "Bentone®," a registered trademark of the Baroid Division of National Lead Company). The quantity of surfactant used will depend on a variety of factors including the physical properties of the reactants and of the inert liquid medium, the time required for the reaction, the efficiency of the emulsifying equipment, the size of reaction product particle desired and so on. In general, from about 0.5% to about 10% of surfactant based on the weight of the —NCO terminated reactant will be used.

Catalysts are ordinarily employed to improve the rate and completeness of reaction. Any of a variety of known catalysts can be used including dibutyl tin dilaurate, stannous octoate, tertiary amines such as N-methylmorpholine and triethyl amine, mercury catalysts such as phenyl mercuric propionate, lead naphthenate, lead octoate and others. Very small amounts only sufficient to provide catalytic action are used and it is preferred that the amount be from about 0.01% to about 1% by weight based on the weight of the reactant.

Any of the well-known emulsating equipment can be used to disperse the reactive materials. Thus, high speed agitating devices and homogenizers in which an emulsion is formed by forcing the materials through narrow openings, have been found effective. These devices are used in accordance with procedures known to those skilled in the art. However, it is preferred to disperse the compound having —NCO groups in the inert liquid medium containing the surfactant to form a creamy emulsion and thereafter to disperse, in either order, the organic compound having groups with active hydrogen and the catalyst. The relative proportions of reactants to inert liquid medium does not appear to be critical and emulsions have been made with as much as 50% by weight of the reactive materials based on the weight of the final emulsion.

In emulsifying liquid reactants it is preferred to operate under conditions giving a droplet size of from 5 to 100 microns, most preferably from 5 to 15 microns. The droplet size is controlled by the severity of agitating or homogenizing action and by the effectiveness of the surface active agent.

The time required for reaction to form solid polyurethane varies with the temperature, the efficiency of the catalyst and the reactivity of the components of the droplets. Reaction times may be from as little as 15 seconds for aliphatic amine—aromatic —NCO reaction to as much as 2 hours for hydroxyl-aliphatic —NCO. Since effective operation of the process to form fine particles depends on maintaining the reactive materials in suspension, the shorter reaction times are preferred.

Carrying out the reaction through dispersion of reactive materials in an inert solvent offers a number of advantages in addition to that of forming fine particle size reaction product directly. That is, good temperature control is achieved since the reaction takes place in a well-agitated liquid and in addition the relative proportions of the reactants are more uniform throughout the reaction system because of the dispersion of the reactive materials so that localized excessive concentrations of one or the other reactive materials are avoided. The process also offers the major advantage over systems in which one reactive material is in solution in that the reactive materials are completely available and will react to exhaustion where the reactive materials in dissolved condition must necessarily depend on a solution gradient.

Because of the fine, uniform, solidified condition of the reaction product, it is readily separated from the inert liquid medium by such known procedures as filtration, centrifugation and decantation. Conventional equipment for performing these operations may be used.

After separation of the finely divided reaction product, the product is normally washed with an inert organic liquid. This washing may be needed to remove the inert liquid forming the continuous phase of the reaction emulsion where that reaction liquid is relatively non-volatile or otherwise difficult to remove. However, in any case, it is important to wash the reaction product in order to remove surfactant which may remain in the product after separation from the continuous phase.

Following the washing step, the reaction product is dried. It has been found useful with some reaction materials to incorporate a finely divided solid material such as talc, silica or pigment to reduce a possible tendency of the particles to become agglomerated. This solid material may be introduced at any convenient stage either before separation of the finely divided reaction product from the inert liquid continuous phase or by suspending the reactive particles in a wash liquid along with the finely divided inorganic material or by admixture or stirring into the fine particles of reaction product either before or after drying.

Drying of the particles of reaction product may be effected in any suitable manner such as on trays or drying screens or by procedure comparable to fluid bed drying in which a slurry of the fine particles of reaction product is suspended in contact with a warm or hot gas. In a drying operation comparable to fluid bed drying, a dusting material to prevent an agglomeration of the particles may be included in the gaseous medium for drying the finely divided product.

The following examples are given to aid in understanding the invention and it is to be understood that the invention is not limited to the particular materials, temperatures, procedures and other conditions set forth in the examples.

Example 1

96.7 gm. of an —NCO terminated prepolymer having a viscosity at 65° C. of 5100 cps. (prepared by reacting 2 equivalents of 4,4'-diphenylmethane diisocyanate with 1 equivalent of —OH terminated polytetramethylene adipate, mol. wt. 1000, for 3 hours at 80° C.) was dispersed in 150 gm. of a liquid paraffinic hydrocarbon mixture (boiling range 174° C. to 207° C.) containing 2.8 gm. of a mixture of polyvinylpyrrolidone copolymers (Ganex) as surfactant. While this mixture was being vigorously agitated at 65° C. there was added 0.1 gm. of dibutyl tin dilaurate and 5.8 gm. of 1,4-butanediol. After ¾ hour agitating, the mixture was filtered and the particulate product rinsed with hexane and air dried. A film prepared from this product on a 150° C. hydraulic press had the following tensile properties:

100% modulus _____ p.s.i__ 1000
Tensile strength _____ p.s.i__ 10,500
Elongation at break _____ percent__ 625

Example 2

40.0 gm. of an —NCO terminated prepolymer (prepared by reacting 2 equivalents of 4,4'-diphenyl methane diisocyanate with 1 equivalent of polytetramethylene ether glycol, mol. wt. 990, for 3 hours at 80° C.) was dispersed in 220 gm. of the hydrocarbon liquid of Example 1 containing 1.3 gm. of calcium stearate and 0.65 gm. of polyoxyethylene stearyl ether as surfactant. While this mixture was being vigorously agitated at 65° C. there was added 0.06 gm. of dibutyl tin dilaurate and 2.41 gm. of 1,4-butanediol. After ¾ hour agitating, the mixture was filtered and the particulate product was rinsed with hexane and air dried. A film prepared from this product on a 175° C. hydraulic press had the following tensile properties:

100% modulus _____ p.s.i__ 650
Tensile strength _____ p.s.i__ 2800
Elongation at break _____ percent__ 720

Example 3

55 gm. of the prepolymer of Example 2 was dispersed in 225 gm. of the hydrocarbon liquid of Example 1 containing 3.7 gm. of a dimethyl-di(tallow oil alkyl) ammonium derivative of a magnesium montmorillonite clay (Bentone 38) as surfactant. While this mixture was being agitated at 65° C. there was added 0.09 gm. of dibutyl tin dilaurate and 3.32 gm. of 1,4-butanediol. After ¾ hour agitating, the mixture was filtered and the particulate product rinsed with hexane and air dried. Over 90% of the material had a particle size between 30 and 100 mesh. A film prepared from this product on a 150° C. press had the following tensile properties:

100% modulus _____ p.s.i__ 665
Tensile strength _____ p.s.i__ 1400
Elongation at break _____ percent__ 500

Example 4

30.1 gm. of an —NCO terminated prepolymer (prepared by reacting 2 equivalents of an isomeric mixture of 80% 2,4- and 20% 2,6-tolylene diisocyanate with 1 equivalent of polytetramethylene ether glycol, mol. wt. 1000, for 3 hours at 80° C.) was dispersed in 75 gm. of the hydrocarbon liquid of Example 1 containing 1.1 gm. of a polyvinylpyrrolidone copolymer as emulsifying agent. While this mixture was being agitated at room temperature, there was added a dispersion of 2.23 gm. of precipitated, finely divided 2-methyl piperazine in the same liquid hydrocarbon. (This dispersion was prepared by dissolving the 2.23 gm. of 2-methyl piperazine in 4.46 gm. of methylene chloride and then adding to this solution 19 gm. of the paraffinic hydrocarbon to form a precipitate.) After ¾ hour agitating, the mixture was filtered and the particulate product rinsed with hexane and air dried. A film prepared from this product on a 175° C. press has the following tensile properties:

100% modulus _____ p.s.i__ 660
Tensile strength _____ p.s.i__ 3500
Elongation at break _____ percent__ 530

Example 5

628 gm. of molten —OH terminated polytetramethylene adipate, mol. wt. 1000, was added slowly with agitating to 314 gm. of molten 4,4'-diphenylmethane diisocyanate. When the addition was complete, 1 gm. of dibutyl tin dilaurate was added causing an immediate rise in viscosity. About ½ hour later 30 gm. of sodium dioctyl sulfosuccinate dissolved in 30 gm. of liquid paraffinic hydrocarbon was added, followed by a solution of 28 gm. of alkyl side chain-containing polyvinyl pyrrolidone dissolved in 1400 gm. of heptane. An emulsion was formed with the prepolymer as the internal phase. While this was being agitated at 74° C., 59.2 gm. of 1,4-butanediol was added. After ¾ hour agitating, the mixture was filtered and the particulate product was rinsed with hexane and air dried. A film prepared from this product on a 160° C. hydraulic press has the following tensile properties:

100% modulus _____ p.s.i__ 1100
Tensile strength _____ p.s.i__ 7500
Elongation _____ percent__ 735

Example 6

To a 47° C. mixture of 62.5 gm. of 4,4'-diphenylmethane diisocyanate, 5.6 gm. of alkyl side chain-containing polyvinyl pyrrolidone and 293 gm. of a liquid paraffinic hydrocarbon mixture (boiling range 174° C. to 207° C.) there was added slowly with stirring 126.2 gm. of polytetramethylene ether glycol, mol. wt. 1000. When the addition was complete 0.2 gm. of dibutyl tin dilaurate was added and the emulsion brought to 60° C. Five minutes later 11.32 gm. of 1,4-butanediol was added to the prepolymer emulsion. After ¾ hour agitating, the mixture was filtered and the particulate product rinsed with hexane and air dried. A film prepared from this product on a 160° C. hydraulic press had the following tensile properties:

100% modulus ........................... p.s.i.. 700
Tensile strength ........................ p.s.i.. 6300
Elongation ............................. percent.. 885

Having thus described my invention what I claim as new and desire to secure as Letters Patent of the United States is:

1. The method for manufacturing finely divided polyurethane resin comprising the steps of separately dispersing in an inert organic liquid medium, an organic compound having at least two active —NCO groups and an organic compound having at least two groups with reactive hydrogen atoms for combination with said compound containing —NCO groups to form said polyurethane resins, said compounds being employed in relative proportions to provide a molar ratio of active hydrogen to —NCO in the range of from about 0.85:1 to about 1.15:1, said compound and the polyurethane resin from reaction of said compounds being substantially insoluble or immiscible in said liquid medium and at least one of said reactive compounds being liquid droplets at reaction temperature, said inert organic liquid medium containing a surfactant selected from the group consisting of alkaline earth metal salts of long chain aliphatic monocarboxylic acids and the product of cation exchange reaction between a long carbon chain fatty amine and montmorillonite clay, agitating the dispersion of said compounds to mix said dispersed reactive compounds and bring reactive droplets of one compound into reactive engagement with droplets or particles of the other compound, in said engaged droplets or particles to form directly fine particles of a solid polyurethane resin reaction product insoluble in said liquid medium and separating said particles from said organic liquid medium.

2. The method for manufacturing finely divided polyurethane resin as defined in claim 1 in which said organic compound having at least two —NCO groups is a prepolymer from reaction of stoichiometric excess of at least one monomeric organic polyisocyanate with at least one organic compound having at least two groups containing active hydrogen atoms and in which said organic compound having at least two groups with reactive hydrogen atoms for reaction with said prepolymer is a member of the class consisting of polyols, polyamines and alkanolamines.

3. The method for manufacturing finely divided polyurethane resin as defined in claim 2 in which said organic compound having at least two —NCO groups and said organic compound having at least two groups with reactive hydrogen atoms are introduced and finely dispersed separately in the inert liquid medium.

4. The method for manufacturing finely divided polyurethane resin as defined in claim 3 in which both of said organic compounds are liquid at the temperature of the inert liquid medium.

5. The method for manufacturing finely divided polyurethane resin as defined in claim 3 in which one of said organic compounds is a solid and the other of said organic compounds is a liquid at the temperature of said inert organic liquid medium.

6. The method for manufacturing finely divided polyurethane resin as defined in claim 2 in which one of said organic compounds for reaction to form a polyurethane is introduced and finely dispersed into a dispersion of the other said organic compounds in said inert organic liquid medium.

7. The method for manufacturing finely divided polyurethane resin as defined in claim 6 in which both of said organic compounds are liquid at the temperature of said inert liquid organic medium.

8. The method for manufacturing finely divided polyurethane resin as defined in claim 6 in which one of said organic compounds is a solid and the other organic compound is a liquid at the temperature of said inert organic liquid medium.

9. The method for manufacturing finely divided polyurethane resin as defined in claim 2 in which said organic compound having at least two active —NCO groups is finely dispersed in a first body of inert organic liquid medium, said organic compound having at least two groups with reactive hydrogen atoms is dispersed in a second body of inert organic liquid medium and said bodies of inert organic liquid medium containing said dispersed organic compounds are combined and mixed for reaction between the dispersed organic compounds.

10. The method for manufacturing finely divided polyurethane resin as defined in claim 9 in which both of said organic compounds are liquid at the temperature of said inert oragnic liquid medium.

11. The method for manufacturing finely divided polyurethane resin as defined in claim 9 in which one of said organic compounds is solid and the other organic compound is liquid at the temperature of said inert organic liquid medium.

12. The method for manufacturing finely divided polyurethane resin as defined in claim 2 in which said prepolymer is formed by finely dispersing at least one organic compound having at least two groups containing active hydrogen atoms in an inert liquid medium in which it is insoluble or immiscible, and reacting said dispersed organic compound in said medium with a stoichiometric excess of at least one organic polyisocyanate to form a fine dispersion of prepolymer insoluble or immiscible in said medium, and in which said prepolymer in finely dispersed form is reacted with at least one organic compound having at least two groups with reactive hydrogen atoms and being insoluble or immiscible in and finely dispersed in said inert liquid medium.

References Cited

UNITED STATES PATENTS

| | | | |
|---|---|---|---|
| 3,525,717 | 8/1970 | Butler et al. | 260—75 |
| 3,420,791 | 1/1969 | Guggiolo et al. | 260—77.5 |
| 3,560,447 | 2/1971 | Bingham | 260—77.5 |
| 3,655,627 | 4/1972 | Hutzler et al. | 260—75 |
| 3,236,812 | 2/1966 | McElroy | 260—75 |

DONALD E. CZAJA, Primary Examiner

E. C. RZUCIDLO, Assistant Examiner

U.S. Cl. X.R.

260—33.2 R, 33.6 UB, 33.8 UB, 75 NE, 77.5 AA, 77.5 AM